(12) United States Patent
Eddings et al.

(10) Patent No.: US 8,739,264 B1
(45) Date of Patent: May 27, 2014

(54) MANAGING ACCESS TO SECURED DATA

(75) Inventors: Justin Clay Eddings, Eudora, KS (US);
Terry Robert Ecklund, Overland Park, KS (US); Sergio Gustavo Canton, Olathe, KS (US); Linda Anne Stark, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 98 days.

(21) Appl. No.: 13/339,584

(22) Filed: Dec. 29, 2011

(51) Int. Cl.
*G06F 21/00* (2013.01)
*G06F 21/35* (2013.01)

(52) U.S. Cl.
CPC .................................. *G06F 21/35* (2013.01)
USPC ........... 726/9; 726/7; 726/10; 726/27; 726/28

(58) Field of Classification Search
None
See application file for complete search history.

(56) References Cited

U.S. PATENT DOCUMENTS

| | | | |
|---|---|---|---|
| 6,182,142 B1* | 1/2001 | Win et al. | 709/229 |
| 2001/0034832 A1* | 10/2001 | Hashikura | 713/156 |
| 2005/0105734 A1* | 5/2005 | Buer et al. | 380/270 |
| 2006/0085844 A1* | 4/2006 | Buer et al. | 726/4 |
| 2006/0136717 A1* | 6/2006 | Buer et al. | 713/155 |
| 2011/0028091 A1* | 2/2011 | Higgins et al. | 455/41.2 |
| 2011/0209208 A1* | 8/2011 | Quach et al. | 726/7 |

\* cited by examiner

*Primary Examiner* — Benjamin Lanier

(57) ABSTRACT

The invention is directed to methods and systems for managing access to secured data. In particular, the invention provides a three-fold security layer to manage access to a virtual application by verifying a user device, user credentials, and a physical identifier. Each of the user device, user credentials, and the physical identifier is associated with a user and identification of each is required to grant access to the virtual application. A user may enter, from an authorized user device, user credentials, such as a user name and password. The user may then physically contact the physical identifier and the user device in order to automatically generate a unique token required to automatically gain access to the virtual application.

18 Claims, 5 Drawing Sheets

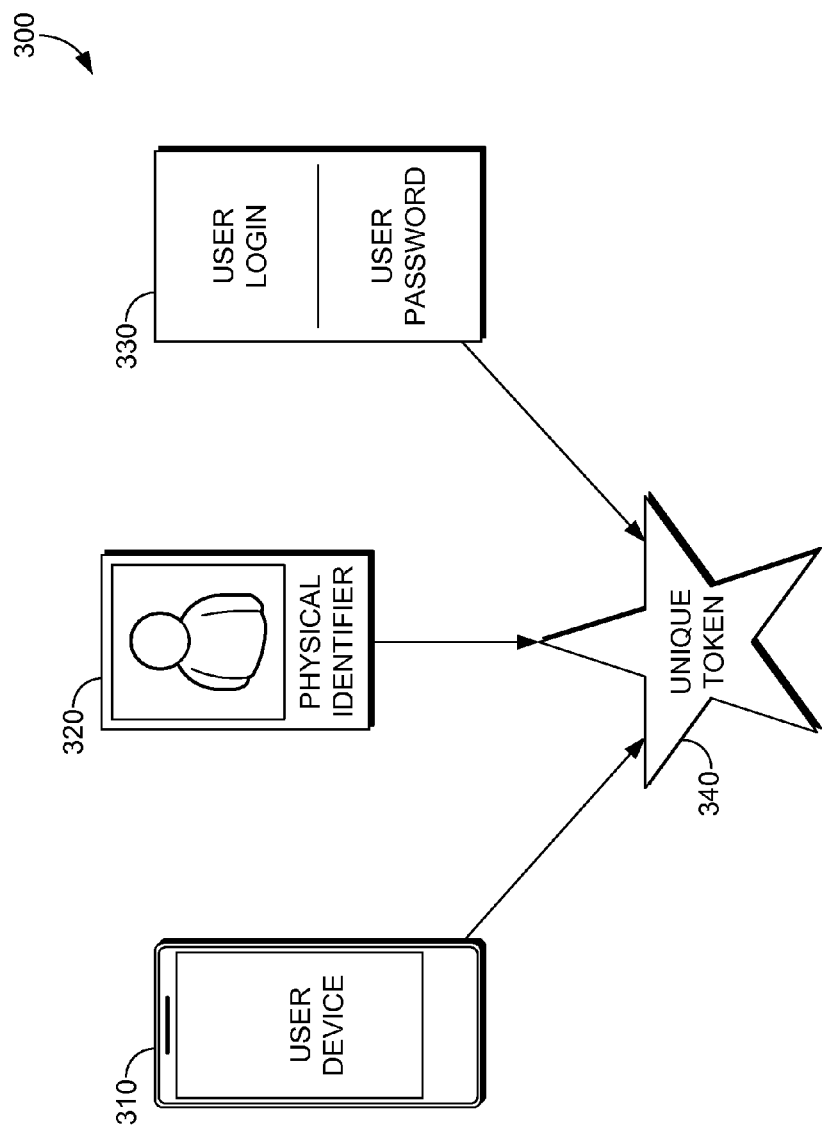

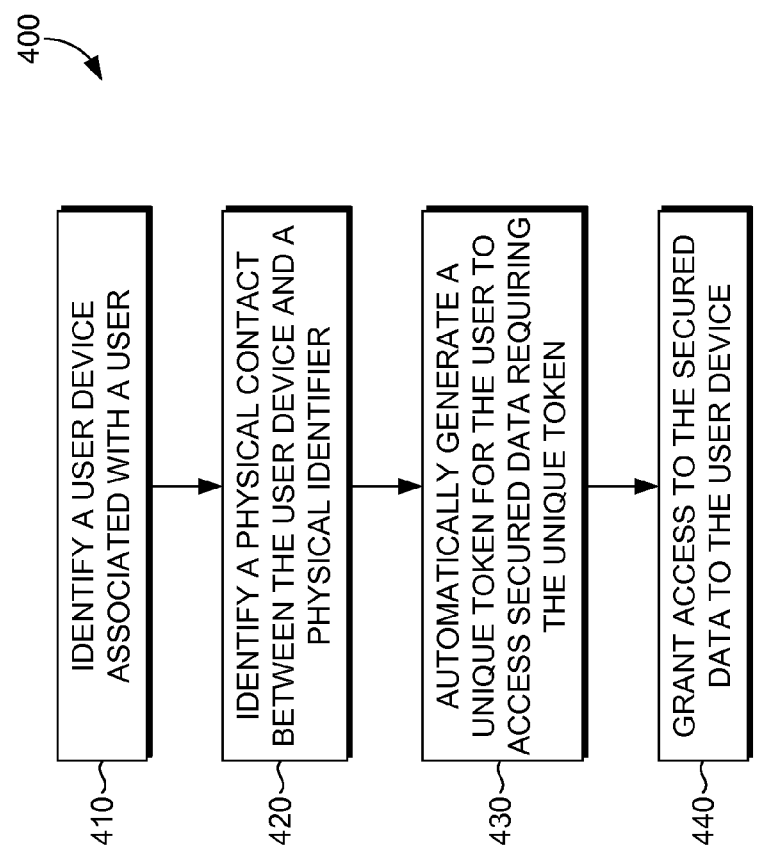

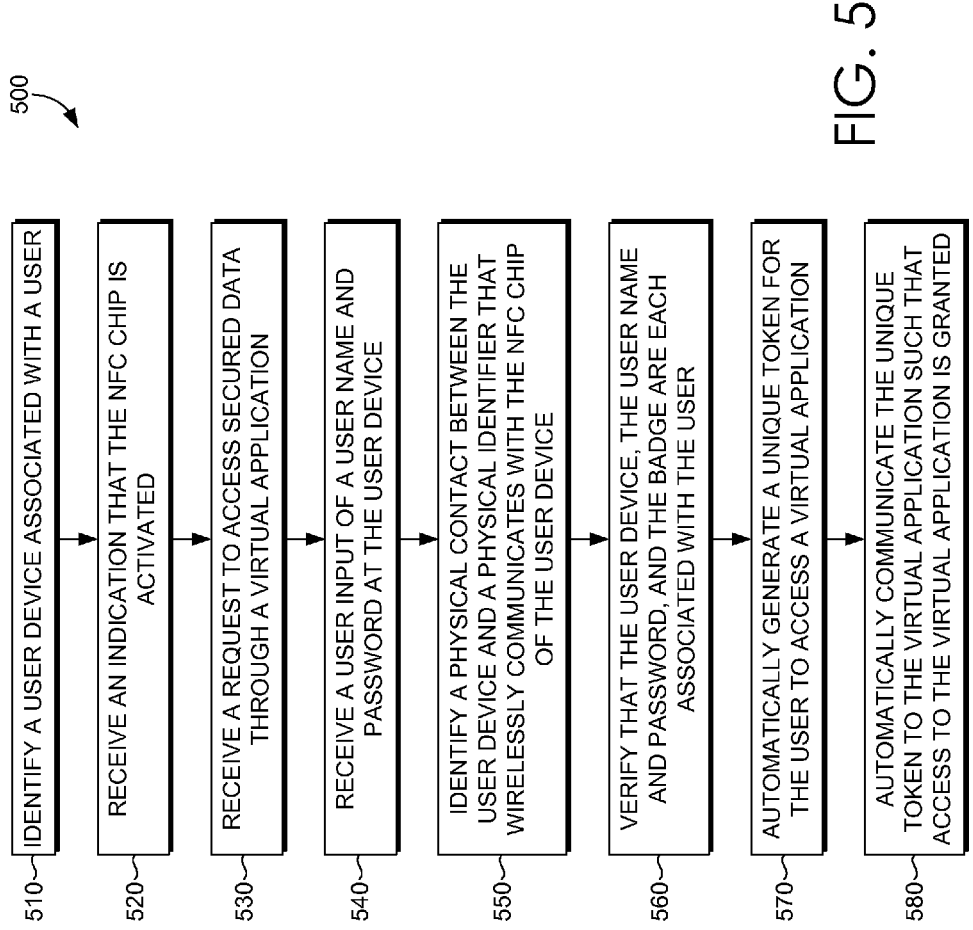

MANAGING ACCESS TO SECURED DATA

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, providing a three-fold security layer to manage access to secured data. In embodiments, access to secured data is granted through a virtual application requiring a unique token. The unique token may be generated utilizing the three-fold security layer: a user device, user credentials (e.g., a user name and password), and a physical identifier that are each associated with a user. The three-fold security layer may be used to gain access to the secured data by physically contacting the physical identifier and the user device with one another. Upon physically contacting the user device and the physical identifier, credentials associated with the physical identifier are communicated to the user device and further communicated, along with the user name and password, to a security manager for validation. By using the three-fold security layer, access to secured data is further protected and a user is not required to input a unique token, as it is automatically generated upon validation of the three layers of security.

BRIEF DESCRIPTION OF THE SEVERAL VIEWS OF THE DRAWINGS

Illustrative embodiments of the present invention are described in detail below with reference to the attached drawing figures, and wherein:

FIG. 3 depicts a diagram of an exemplary system for carrying out embodiments of the present invention;

FIG. 4 depicts an illustrative flow diagram that depicts a method for managing access to secured data, in accordance with an embodiment of the present invention; and FIG. 5 depicts an illustrative flow diagram that depicts a method for managing access to secured data, in accordance with an embodiment of the present invention.

DETAILED DESCRIPTION

Figure 1:
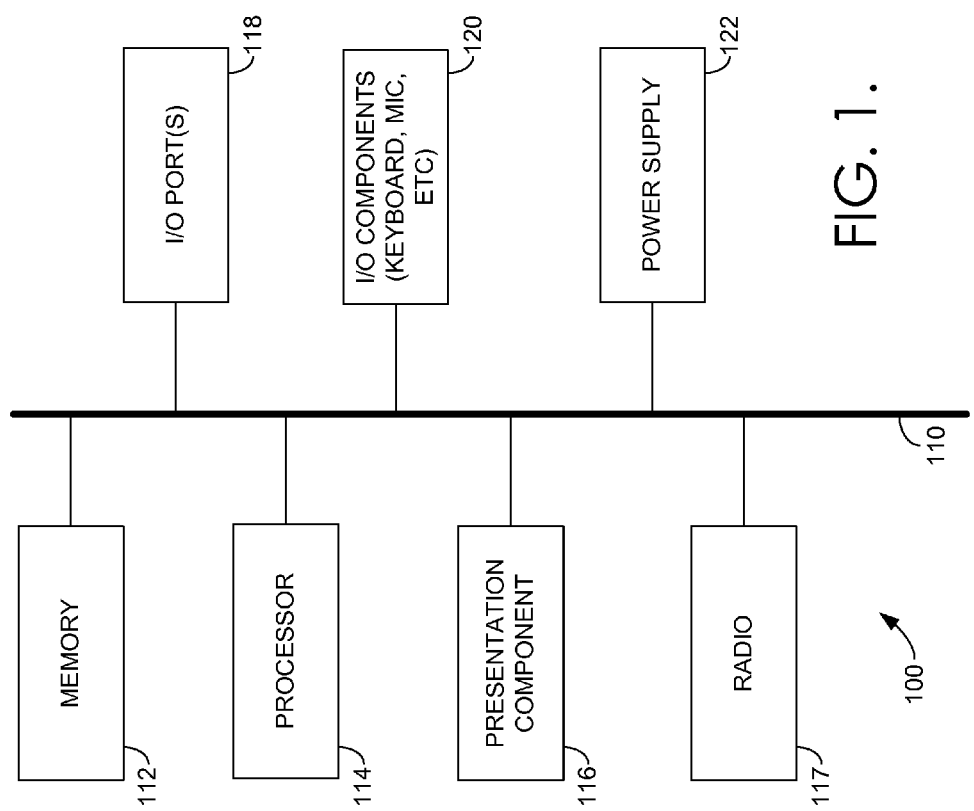
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BTS Base Transceiver Station
GPRS General Packet Radio Service
GSM Global System for Mobile communications (Groupe Spécial Mobile)
HA Home Agent
HTTP Hypertext Transfer Protocol
IP Internet Protocol
IPv4 Internet Protocol Version Four
IPv6 Internet Protocol Version Six
NFC Near-Field Communication
PDA Personal Data Assistant
PDSN Packet Data Serving Node
PPP Point-to-Point Protocol
RNC Radio Network Controller Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed toward managing access to secured data. Specifically, embodiments of the present invention are directed toward providing a three-fold security layer to manage access to secured data. Generally, data that is desired to be protected, or secured, is accessible via a secured network or a virtual application, such as a Citrix Receiver. A user must enter both log-in credentials and a randomly generated token to access the virtual application and, thus, the secured data. This only provides two layers of security which are easily obtained by users that should not have access to the secured data. For instance, all that is needed for an unauthorized user to obtain access to the secured information is to gain knowledge of an authorized user's log-in information and obtain a token for the virtual application. By using a three-fold security layer that requires physical identifiers, it makes it much harder for unauthorized users to gain access to secured data as physical objects are required to make contact to access the secured data. Further, a user is not required to input the token in the present invention as it is automatically generated.

In a first aspect, computer-readable media having computer-executable instructions embodied thereon that, when executed, enable a computing device to perform a method of managing access to secured data is provided. A user device, such as a computer or a mobile phone, is identified as being associated with a user. The association may be created in any way known in the art. A physical contact between the user device and a physical identifier is identified. The physical identifier may be any object that wirelessly communicates with a user device. The physical contact may be any direct, physical contact between the physical identifier and the user device at any location on the user device and/or physical identifier. Upon identifying the physical contact between the user device and the physical identifier, a unique token is automatically generated for the user to access secured data that requires the unique token. Access to the secured data is granted.

In a second aspect, a system for managing access to secured data is provided. The system includes, in part, a user device for receiving and processing credentials that are communicated from one or more physical identifiers; one or more physical identifiers for communicating, through physical contact, the credentials to the user device; and a manager for managing access to secured data through a virtual application by validating the credentials, wherein the user device is registered with the manager and provides the manager with a user name and password for the user and the credentials received from the one or more physical identifiers; and wherein the manager automatically grants access to the virtual application by validating the physical contact between the user device and the one or more physical identifiers.

In a third aspect, computer-readable media having computer-executable instructions embodied thereon that, when executed, enable a computing device to perform a method of managing access to secured data is provided. A user device associated with a user identified. The user device may be a mobile phone that includes a NFC chip. An indication is received that the NFC chip is activated. A request is received to access secured data through a virtual application. A user input of a user name and password is received at the user device. A physical contact between the user device and a physical identifier that wirelessly communicates with the NFC chip of the user device is identified. In embodiments, the physical identifier is a badge. Upon identifying the physical contact between the user device and the physical identifier, verifying that the user device, the user name and password, and the badge are each associated with the user. Upon verifying that the user device, the user name and password, and the badge are each associated with the user, a unique token is automatically generated for the user to access the virtual application. The unique token is automatically communicated to the virtual application such that access to the virtual application is granted.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as Wimax® technology and also Long Term Evolution (LTE)). In some embodiments, radio 117 might also facilitate other types of wireless communications including Wi-Fi®, Bluetooth® communications, GIS communications, and other near-field communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
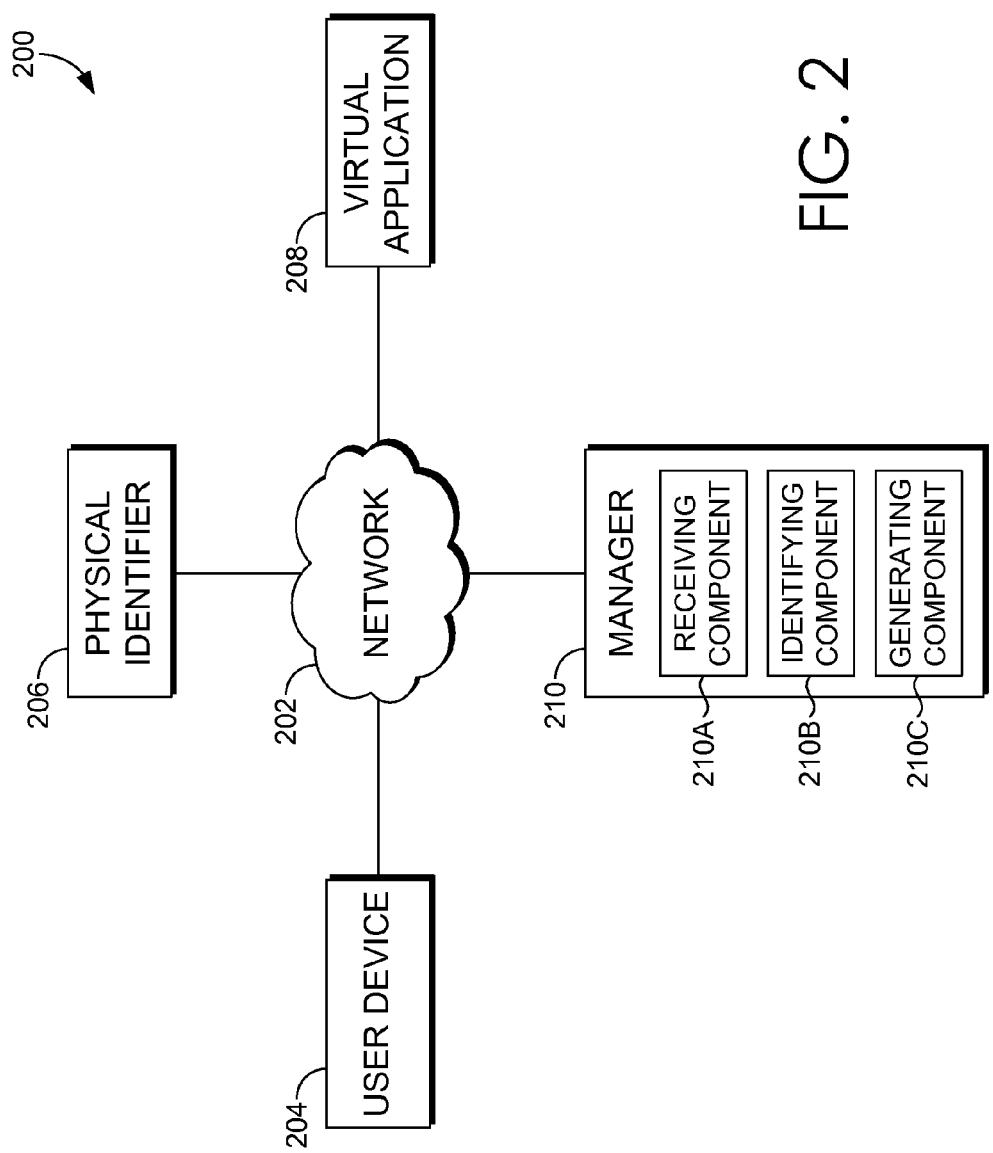
FIG. 2 depicts a system diagram of an exemplary system for carrying out embodiments of the present invention.

FIG. 2 depicts a block diagram of an exemplary system suitable for managing access to secured data and is referenced generally by the numeral 200. It will be understood that the exemplary system 200 shown in FIG. 2 is merely an example of one suitable computing system environment for use with embodiments of the present invention. Neither should the exemplary system 200 be interpreted as having any dependency or requirement related to any single module/component or combination of modules/components illustrated therein. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The exemplary system 200 includes a network 202, a user device 204, a physical identifier 206, a virtual application server 208, and a manager 210. As mentioned, other components not shown here may also be used to carry out aspects of the present invention. Further, several components shown in FIG. 2 may be combined into a single component although shown separately in FIG. 2. The components illustrated in FIG. 2 may communicate with one another by way of network 202. Network 202 may include, without limitation, one or more LANs and/or wide area networks WANs. Such networking environments are commonplace in offices, enterprise-wide computer networks, intranets, and the Internet. Accordingly, network 202 is not further described herein.

User device 204 may be the device 110 of FIG. 1. In particular, user device 204 may be any device capable of wirelessly communicating with another device and/or a physical identifier, as discussed below. User device 204 may communicate with network 202 by way of a communications link. The communications link may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (e.g., a primary connection and a secondary connection). A short-range connection may include a Wi-Fi® connection to a device (e.g., mobile hotspot) that provides access to a wireless communications network, such as a WLAN connection using 802.11 protocol. A long-range connection may include a connection using one or more of CDMA, GPRS, GSM, TDMA, and 802.16.

Generally, the communications link provides access to what some skilled artisans refer to as a wireless communications network, also termed a core network and illustrated as network 202. The network 202 may comprise one or more of the components illustrated in FIG. 2. To the contrary, not all components that make up a wireless communications network are shown. Also, not all connections or possible connections are shown. The communications link may be one or more of a base transceiver station (BTS) tower, a Wi-Fi® Router, a Mobile Hotspot, and any other device that facilitates communication between user device 204 and network 202.

As mentioned, some components are not depicted in FIG. 2 so as to not obscure aspects of the various embodiments of the present invention. For instance, network 202 may include various components that are not shown. One of these components may be a network-access gateway (not shown) that helps facilitate communication between user device 204 and other networks (not shown) as well as the Internet (not shown).

In embodiments, user device 204 includes a Near-Field Communication (NFC) chip. The NFC chip may be configured with specialized hardware and/or software in order to perform operations of the present invention. The NFC chip may be configured to recognize when a physical identifier, such as physical identifier 206, is in physical contact or close proximity to user device 204. User device 204 may be any device that can include a NFC chip. For example, user device 204 may be a personal computer (PC), a tablet, a mobile phone, or the like. In embodiments, user device 204 is a wireless telecommunications device, such as a mobile phone.

Physical identifier 206 may be any physical object capable of wirelessly communicating with a user device, such as user device 204. For example, physical identifier 206 may be an employee badge, a student badge, a government ID, or the like. The wireless communication performed by physical identifier 206 may be accomplished using radio frequency identification (RFID) technology, magnetic technology, Bluetooth® technology, or any other known means of wireless communication. In an embodiment, physical identifier 206 is an employee identification badge with RFID technology incorporated therein.

Virtual application server 208 may be any known virtual application provider. For instance, virtual application server 208 may be a Citrix receiver. Virtual application servers are commonplace in offices, enterprise-wide computer networks, intranets, and the Internet and, as such, virtual application servers are not further described herein.

Manager 210 includes a receiving component 210A, an identifying component 210B, and a generating component 210C. Each component of manager 210 may assist in managing access to secured data. Manager 210 may be implemented as a stand-alone component or, alternatively, may be integrated into one or more components of system 200. In application, manager 210 may be configured to manage access to secured data. Presently, a virtual application server requires input of both a user log-in and a randomly generated token in order to access the virtual application server (i.e., the secured data). Thus, a user log-in, from any device and a randomly generated token are input by a user and access is granted to the secured data.

Manager 210 utilizes receiving component 210A, identifying component 210B, and generating component 210C to identify a user log-in input by a user, a device associated with a user, and a physical identifier associated with a user and/or device to provide an added layer of security before granting access to the secured data. In short, no longer is a user log-in from any computer and an input token required to gain access but, rather, a user log-in from an authorized device and a physical contact between the authorized device and a physical identifier associated with said device are required in order to generate a unique token to gain access to the secured data.

Receiving component 210A may be configured for receiving and/or processing credentials that are received from one or more user devices, one or more physical identifiers, such as physical identifier 206, and the like. Credentials may be any set of authorizing data designated to be communicated to receiving component 210A to gain access to secured data and, in particular, a virtual application server.

Identifying component 210B may be configured for identifying received credentials and identifying associations between devices, credentials, physical identifiers, users, and the like. For instance, identifying component 210B may identify a device that is associated with a particular user, a user name and password that are associated with a particular user, a physical identifier that is associated with a particular user, a physical identifier that is associated with a particular device, and the like.

Generating component 210C may be configured for automatically generating a unique token to access secured data. Generating component 210C may automatically generate the unique token upon receiving an indication from identifying component 210B that the credentials are validated. For instance, identifying component 210B may validate the credentials by verifying that each credential is associated with an appropriate user and/or device. For instance, if the input user name and password are invalid, the credentials are not valid. Further, if a physical identifier that is not associated with a user and/or device is physically contacted with an authorized device, the credentials are not valid.

As an example, an entity (e.g., a business associated with data that requires secured access) may desire a three-layer security system utilizing the present invention. The entity may distribute to each employee an employee badge that is capable of wirelessly communicating with a user device. In embodiments, the employee badge is capable of wirelessly communicating with a NFC chip of a user device. Additionally, the entity will associate each employee with a user name and password, as well as an authorized device. The authorized device may be an entity-issued computer, such as a laptop, a mobile phone, or the like.

In order for the employee (i.e., the user) to gain access to the entity's secured data, the employee may launch a virtual application utilized by the entity. The user may input, into the authorized device associated with their user profile, a user name and password that are also associated with their user profile. Once the user name and password are input, the only data required to access the virtual application is a unique token. Rather than a system randomly generating a unique token for the user to input, the user may physically contact the employee badge (i.e., the physical identifier) to the authorized user device in order to generate the unique token. In embodiments, a NFC chip of the user device is activated prior to the physical contact of the user device and the physical identifier.

When the user contacts the employee badge with the authorized device, data is communicated between the two such that the credentials received (i.e., the user name and password, the user device identity, and the physical contact between the user device and the physical identifier) are validated. Once the credentials are validated, a unique token may be automatically generated and communicated to the virtual application such that access is automatically granted to the user without a user input of the unique token. This saves time on the part of the user and adds another layer of security to the access of the secured data.

Turning now to FIG. 3, an exemplary embodiment of the present invention is illustrated, and referenced generally as the numeral 300. System 300 includes a user device 310, a physical identifier 320, a user log-in 330, and a unique token 340. As illustrated in FIG. 3, the order of the steps does not matter. In other words, user log-in 330 may be input prior to the physical contact between user device 310 and physical identifier 320 or afterwards. Once all three security layers are received, unique token 340 may be automatically generated and communicated such that access is granted to the desired secured data.

Turning now to FIG. 4, referenced generally by the numeral 400, a flow diagram is depicted showing a method of managing access to secured data. Initially, at step 410, a user device, such as a computer or a mobile phone, is identified as being associated with a user. The association may be created in any way known in the art. For example, the user device identity may be manually input into a user profile, the user device may be scanned in association with a user profile, and the like. At step 420, a physical contact between the user device and a physical identifier is identified. The physical identifier may be any object capable of wirelessly communicating with a user device. The physical contact may be any action that causes the user device and the physical identifier to come in physical contact with one another at any location on either respective object. At step 430, a unique token is automatically generated for the user to access secured data. The unique token is automatically generated upon identifying the physical contact between the user device and the physical identifier. The unique token is also automatically generated such that user input of the token is not required. At step 440, access to the secured data is granted to the user.

Turning now to FIG. 5, referenced generally by the numeral 500, a flow diagram is depicted showing a method of managing access to secured data. Initially, at step 510, a user device associated with a user is identified. The association between the user and the user device may be created in any way known in the art. For example, the user device identity (e.g., a serial number of a user device) may be manually input into a user profile, the user device may be scanned in association with a user profile, and the like. The user device may include a NFC chip. At step 520, an indication is received that indicates the NFC chip has been activated. The NFC chip may be activated in any way known in the art. For instance, the NFC may be automatically activated each time the user device is turned on, the NFC chip may be activated when a user manually switches the status of the NFC chip from inactive to active, and the like.

At step 530, a request is received to access secured data through a virtual application. The request may be a user launching a virtual application, a user selecting data that is secured, and the like. At step 540, user input of a user name and password are received at the user device. The user name and password may be associated with the user in any way known in the art. For instance, the user name and password may be stored in a database in association with the user's profile. At block 550, a physical contact between the user device and a physical identifier is identified. The physical identifier is any object that wirelessly communicates with the NFC chip of the user device. In embodiments, the physical identifier is a badge. The physical contact may be any action that causes the user device and the physical identifier to come in physical contact with one another at any location on either respective object.

Upon identifying the physical contact between the user device and the physical identifier, it is verified that the user device, the user name and password, and the badge are each associated with the user at block 560. The verification may be performed by referencing a database storing a user profile including all devices, physical identifiers, and user log-in information associated with a user. At block 570, a unique token is automatically generated for the user to access secured data. The unique token is automatically generated upon verifying that the user device, the user name and password, and the badge are each associated with the user. Should one of the items not be associated with the user, the verification will fail and the unique token will not be generated. At block 580, the unique token is automatically communicated such that access to the secured data is granted.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, enable a computing device to perform a method of managing access to secured data, the method comprising:
   identifying a user device associated with a user, wherein the user device includes a Near-Field Communication (NFC) chip;
   receiving a user input of a user name and password at the user device;
   detecting a close proximity between the user device and a physical identifier that wirelessly communicates credentials to the NFC chip of the user device when the close proximity is detected;
   subsequent to (1) receiving the user name and the password and (2) receiving the credentials from the physical identifier,
      (1) automatically generating a unique token for the user to access secured data through a virtual application requiring the unique token, and
      (2) automatically communicating the unique token to the virtual application that is to be accessed such that no user intervention is required; and
   granting the user device access to the secured data through the virtual application.

2. The media of claim 1, wherein the user device is a telecommunications device.

3. The media of claim 2, wherein the telecommunications device is a mobile phone.

4. The media of claim 1, wherein the user device is a personal computer.

5. The media of claim 1, wherein the physical identifier is a badge.

6. The media of claim 1, wherein the physical identifier is capable of wirelessly communicating with the user device using one or more of Bluetooth technology, magnetic technology, or radio frequency identification technology.

7. The media of claim 1, further comprising validating the close proximity between the user device and the physical identifier.

8. The media of claim 1, wherein the unique token is automatically communicated such that a user input of the unique token is not required upon validating the close proximity between the user device and the physical identifier.

9. A system for managing access to secured data, the system comprising:
- a user device for receiving and processing credentials that are communicated from one or more physical identifiers, wherein the user device is associated with a user and includes a Near-Field Communication (NFC) chip;
- one or more physical identifiers for wirelessly communicating the credentials to the NFC chip of the user device when a close proximity is detected between one of the one or more physical identifiers and the user device; and
- a manager for managing access to secured data through a virtual application by validating the credentials, wherein the user device is registered with the manager and provides the manager with a user name and password for a user and the credentials received from the one or more physical identifiers, the manager performing the steps of:
  - (1) validating the close proximity between the user device and the one of the one or more physical identifiers;
  - (2) subsequent to the manager receiving the user name and password for the user, receiving the credentials from the one or more physical identifiers, and validating the close proximity between the user device and the one of the one or more physical identifiers, automatically generating a unique token to access the virtual application;
  - (3) automatically communicating the unique token to the virtual application such that no user intervention is required; and
  - (4) granting access to the virtual application.

10. The system of claim 9, wherein the user device includes a processor and a memory.

11. The system of claim 9, wherein the user device is a mobile phone.

12. The system of claim 9, wherein the physical identifier is an employee badge.

13. The system of claim 9, wherein the one or more physical identifiers is capable of communicating with the user device using one or more of Bluetooth technology, magnetic technology, or radio frequency identification technology.

14. Non-transitory computer-readable media having computer-executable instructions embodied thereon that, when executed, enable a computing device to perform a method of managing access to secured data, the method comprising:
- identifying a user device associated with a user, wherein the user device is a mobile phone that includes a Near-Field Communication (NFC) chip;
- receiving an indication that the NFC chip is activated;
- receiving a request to access secured data through a virtual application;
- receiving a user input of a user name and password at the user device;
- detecting a close proximity between the user device and a physical identifier that wirelessly communicates credentials to the NFC chip of the user device when the close proximity is detected, wherein the physical identifier is a badge; and
- subsequent to (1) receiving the user name and the password and (2) receiving the credentials from the badge,
  - (1) automatically generating a unique token for the user to access the virtual application, and
  - (2) automatically communicating the unique token to the virtual application such that access to the virtual application is granted.

15. The media of claim 14, wherein upon automatically communicated the unique token to the virtual application, access to the virtual application is automatically granted to the user without user intervention.

16. The media of claim 14, wherein the physical identifier wirelessly communicates with the user device using Bluetooth technology or magnetic technology.

17. The media of claim 14, wherein the physical identifier wirelessly communicates with the user device using radio frequency identification technology.

18. The media of claim 14, further comprising:
- receiving an indication that the physical identifier and the user device are associated with the user.

* * * * *